(12) United States Patent
Haot et al.

(10) Patent No.: US 8,667,160 B1
(45) Date of Patent: Mar. 4, 2014

(54) SYSTEM AND METHOD FOR INTERNET AUDIO/VIDEO DELIVERY

(76) Inventors: Max Haot, New York, NY (US); Phillip Tomasz Worthington, London (GB); Mark Kornfilt, New York, NY (US); Dayananda Nanjundappa, Bangalore (IN); Roger Kapsi, Brooklyn, NY (US)

(*) Notice: Subject to any disclaimer, the term of this patent is extended or adjusted under 35 U.S.C. 154(b) by 0 days.

(21) Appl. No.: 12/025,360

(22) Filed: Feb. 4, 2008

Related U.S. Application Data

(60) Provisional application No. 60/887,922, filed on Feb. 2, 2007, provisional application No. 60/913,402, filed on Apr. 23, 2007.

(51) Int. Cl.
*G06F 15/16* (2006.01)

(52) U.S. Cl.
USPC ........... 709/231; 709/203; 709/204; 709/205; 709/215; 725/97; 725/109; 725/119; 725/153

(58) Field of Classification Search
USPC ............ 709/215, 205, 231, 203, 204; 725/97, 725/109, 119, 153
See application file for complete search history.

(56) References Cited

U.S. PATENT DOCUMENTS

| | | | | |
|---|---|---|---|---|
| 4,466,063 A * | 8/1984 | Segarra et al. | ................. | 709/226 |
| 5,884,046 A * | 3/1999 | Antonov | ........................ | 709/238 |
| 5,996,022 A * | 11/1999 | Krueger et al. | ................ | 709/247 |
| 5,999,525 A * | 12/1999 | Krishnaswamy et al. | .... | 370/352 |
| 6,466,275 B1 * | 10/2002 | Honey et al. | .................. | 348/722 |
| 6,487,622 B1 * | 11/2002 | Coskrey et al. | ............... | 710/241 |
| 6,505,160 B1 * | 1/2003 | Levy et al. | .................... | 704/270 |
| 6,553,404 B2 * | 4/2003 | Stern | ............................. | 709/203 |
| 6,605,770 B2 * | 8/2003 | Yamane et al. | ................. | 84/609 |
| 7,114,174 B1 * | 9/2006 | Brooks et al. | ................. | 725/105 |
| 7,263,710 B1 * | 8/2007 | Hummel et al. | ................ | 725/86 |
| 7,428,704 B2 * | 9/2008 | Baker et al. | ................... | 715/730 |
| 7,519,273 B2 * | 4/2009 | Lowthert et al. | ............. | 386/248 |
| 7,610,607 B1 * | 10/2009 | Kiraly | ........................... | 725/119 |
| 7,743,161 B2 * | 6/2010 | Dey et al. | ...................... | 709/231 |
| 8,090,613 B2 * | 1/2012 | Kalb et al. | ..................... | 705/7.29 |
| 8,516,149 B1 * | 8/2013 | Edmett Stacey | ............. | 709/238 |
| 2001/0042249 A1 * | 11/2001 | Knepper et al. | ................ | 725/42 |

(Continued)

OTHER PUBLICATIONS

Printout of Dec. 30, 2006 webpage of http://youtube.com (retrieved from http://webarchive.org/web*http:\\youtube.com on Jun. 4, 2009)—submission includes 6 pages of youtube and 6 pages of web.archive search results.

(Continued)

*Primary Examiner* — Krista Zele
*Assistant Examiner* — Anthony Fabbri

(57) ABSTRACT

One embodiment of the present invention relates to a system for distributing audio/video convent via a network, comprising: a client software application, and a channel control software application, wherein the client software application and the channel control software application are operatively connected together via the network such that the client software application receives at least one control message from the channel control software application, wherein the at least one control message causes the client software application to access at least: i) a first audio/video data element and ii) a second audio/video data element, and wherein the at least one control message causes the client software application to composite together at least: i) the first audio/video data element and ii) the second audio/video data element and to render at least the composited first and second audio/video data elements at a client device running the client software application.

8 Claims, 9 Drawing Sheets

(56) References Cited

U.S. PATENT DOCUMENTS

| | | | |
|---|---|---|---|
| 2002/0097979 A1* | 7/2002 | Lowthert et al. | 386/46 |
| 2002/0143976 A1* | 10/2002 | Barker et al. | 709/231 |
| 2003/0051051 A1 | 3/2003 | O'Neal et al. | |
| 2003/0122922 A1* | 7/2003 | Saffer et al. | 348/14.01 |
| 2003/0182315 A1* | 9/2003 | Plastina et al. | 707/200 |
| 2003/0233650 A1* | 12/2003 | Zaner et al. | 725/32 |
| 2004/0017997 A1* | 1/2004 | Cowgill | 386/65 |
| 2004/0103208 A1* | 5/2004 | Chung et al. | 709/236 |
| 2004/0186877 A1* | 9/2004 | Wang et al. | 709/200 |
| 2004/0221246 A1* | 11/2004 | Emerson et al. | 716/1 |
| 2005/0055716 A1* | 3/2005 | Louie et al. | 725/58 |
| 2005/0108430 A1* | 5/2005 | Howarth et al. | 709/245 |
| 2005/0198677 A1* | 9/2005 | Lewis | 725/87 |
| 2005/0203801 A1* | 9/2005 | Morgenstern et al. | 705/14 |
| 2005/0264648 A1* | 12/2005 | Ivashin et al. | 348/14.09 |
| 2005/0286546 A1* | 12/2005 | Bassoli et al. | 370/432 |
| 2006/0039303 A1* | 2/2006 | Singer et al. | 370/310 |
| 2006/0039304 A1* | 2/2006 | Singer et al. | 370/310 |
| 2006/0074750 A1* | 4/2006 | Clark et al. | 705/14 |
| 2006/0136572 A1* | 6/2006 | Stern et al. | 709/217 |
| 2006/0136597 A1* | 6/2006 | Shabtai et al. | 709/231 |
| 2006/0143236 A1* | 6/2006 | Wu | 707/104.1 |
| 2006/0146765 A1* | 7/2006 | Van De Sluis et al. | 370/338 |
| 2006/0168126 A1* | 7/2006 | Costa-Requena et al. | 709/219 |
| 2006/0259607 A1 | 11/2006 | O'Neal et al. | |
| 2007/0061409 A1* | 3/2007 | Rydenhag | 709/217 |
| 2007/0183741 A1* | 8/2007 | Lerman et al. | 386/54 |
| 2008/0016196 A1* | 1/2008 | MacMillan et al. | 709/223 |
| 2008/0059992 A1* | 3/2008 | Amidon et al. | 725/25 |
| 2008/0263582 A1* | 10/2008 | Okamoto et al. | 725/29 |

OTHER PUBLICATIONS

Creative COW News & Press Releases; News: Serious Magic Announces the Immediate Availability of DV Rack 2.0; Last updated: Sep. 9, 2006 7:09 PM GMT.

DigitalSignageToday.com; Make Your Digital Signage Deployment a Big Success; Nov. 22, 2005; http://www.digitalsignagetoday.com/article.php?id=4026.

Home—Joost; May 31, 2009; (c) 2006-2009 Joost N.V. http://www.joost.com/.

About Us—Joost; May 31, 2009; (c) 2006-2009 Joost N.V. http://www.joost.com/about/.

Gil, Joaqun 'Kino'; A CreativeCOW.net Product Review; CreativeCOW's Joaquin 'Kino' Gil Looks at: Ultra 2 from Serious Magic; Marina del Ray, Sep. 2005; (c) 2005 by Joaquin Gil and CreativeCOW.net.

Goetzl, David; MediaPostNews; MediaDailyNews Story: With Fries: McDonald's Rolls Out In-Store Network; Apr. 21, 2009 3:08 PM.

\* cited by examiner

SYSTEM AND METHOD FOR INTERNET AUDIO/VIDEO DELIVERY

RELATED APPLICATIONS

This application claims the benefit of U.S. Provisional Application Ser. No. 60/887,922, filed Feb. 2, 2007 and U.S. Provisional Application Ser. No. 60/913,402, filed Apr. 23, 2007. Each of the aforementioned applications is incorporated herein by reference in its entirety.

FIELD OF THE INVENTION

One embodiment of the present invention relates to a system for Internet audio/video delivery.

Another embodiment of the present invention relates to a method for Internet audio/video delivery.

For the purposes of describing and claiming the present invention, the term "audio/video content" is intended to refer to audio content and/or video content (including, without limitation, still pictures and/or moving pictures).

Further, for the purposes of describing and claiming the present invention the term "audio/video data element" is intended to refer to audio/video content in the form of a computer-readable data stream or file (including, without limitation, an audio file such as .midi, .wav, .mp3; a still picture file such as .jpg, .tiff, .bmp; a multimedia file such as .mov, .mpg, avi; and/or an animation such as .swf (a file created with ADOBE software). Of note, a given audio/video data element (e.g., a .swf file) may be a composite of other audio/video data elements.

BACKGROUND OF THE INVENTION

Two examples of patent publications related to distributing data over a computer network include the following: U.S. Patent Application Publication 2006/0259607, published Nov. 16, 2006 in the name of O'Neal et al. and U.S. Patent Application Publication 2003/0051051, published Mar. 13, 2003 in the name of O'Neal et al.

Figure 1:
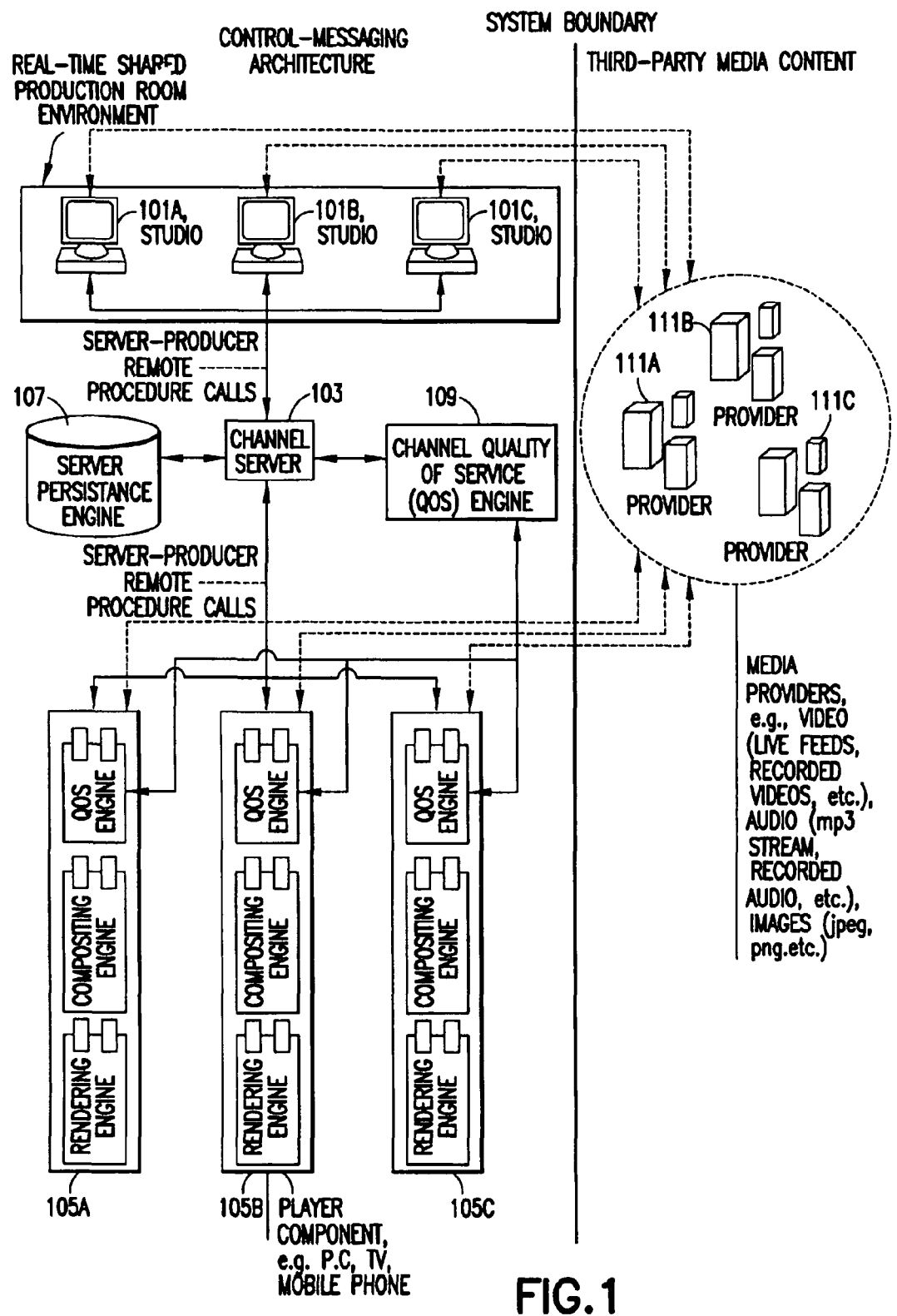
FIG. 1 shows a system architecture according to one embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, any trademarks, company names and the like referred to in the present application are intended to be illustrative, and not restrictive. Further still, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Of note, the application may contain some material that may be subject to copyright protection. A disclaimer of copyright with regard to any material owned by another party is hereby made.

In one embodiment the present invention relates to an online service/platform to enable anybody to launch their own 24/7 TV station on the Internet. As opposed to services like Youtube (e.g., where single video clips can be uploaded and viewed), the service/platform of this embodiment enables users to create 24/7 linear channels which can include pre-recorded audio/video content organized in playlists as well as live audio/video content (like a news program, talk show, etc.). The channels may be interactive as viewers may contact the producers to participate in the show (e.g., using the viewer's webcam and/or microphone). Each of the channel producers may have access to a "studio" which allows each producer to control the channel in realtime, such as, for example, by mixing live cameras, creating playlists, controlling graphics like a channel bug, etc. Various embodiments of the present invention thus permit one or more channels to be controlled by groups of people together in realtime.

In another embodiment the present invention relates to an architecture to enable live television/audio/video distribution. In this regard, whereby traditional TV broadcast is done by rendering/mixing a signal at the broadcast station which is then encoded as a finished product and transmitted to viewers as a complete video stream from a single source, various embodiments of the present invention may utilize a distribution system sending to the viewers (e.g., all the viewers) "control messages" (e.g., "play this video now", "put this graphic there", "switch to this live camera signal", etc.). Based upon such control messages a player component (e.g., disposed on a computer associated with each viewer) is then responsible in this embodiment to access the content from one or more sources (e.g., from third party servers), to buffer the content, to assemble the content, to synchronize the content and to play the content seamlessly giving the impression to the viewer of a live stream playing.

Referring now to FIG. 1, a system architecture according to one embodiment of the present invention is shown. As seen in this FIG. 1, studios 101A-101C are provided (while three studios are shown in this example, any desired number of such studios may be provided). In one example, each of studios 101A-101C may be associated with a given person acting as a producer and each of studios 101A-101C may comprise software running on a computer. In one specific example, each of studios 101A-101C may comprise software (such as ADOBE Flash/Flex/ActionScript 3 software) running in a web browser Further, each of studios 101A-101C communicates with channel server 103, which may control one or more channels (of course, any desired number of channels and/or channel servers may be utilized under the present invention). In one example, such communication may be via the Internet. The communication between each of studios 101A-101C and channel server 103 may comprise: (a) control messages from each of studios 101A-101C to channel server 103 for use in controlling each player component 105A-105C (discussed in more detail below); (b) control messages from channel server 103 to each of studios 101A-101C for use in controlling each of studios 101A-101C (e.g., what to display on a screen of one of the studios based upon what other producers at one or more of the other studios are doing, what to display on a screen of one of the studios based upon what is being displayed at one or more player components); and/or (c) audio/video content to be sent by channel server 103 to one or more of player components 105A-105C (discussed in more detail below).

Channel server 103 also communicates (e.g., directly via an intranet and/or indirectly via the Internet) with server persistence engine 107 and channel quality of service engine 109.

As mentioned above, player components 105A-105C are controlled by channel server 103 (e.g., through control messages sent from channel server 103 via the Internet). In one example, each of player components 105A-105C may be associated with a given person acting as a viewer and each of player components 105A-105C may comprise software running on a computer (while three player components are shown in this example, any desired number of such player components may be provided). In one specific example, each of player components 105A-105C may comprise software (such as ADOBE Flash/Flex/ActionScript 3 software) running in a web browser. In another specific example, each player component may comprise a PC, a TV and/or a mobile device (e.g., a mobile phone or PDA). In another specific example, each of player components 105A-105C may comprise a quality of service (CMOS) engine, a compositing engine and a rendering engine.

Based upon control messages received by each of player components 105A-105C from channel server 103 (wherein the messages may vary for different player components and/or the messages may be the same for different player components), each of player components 105A-105C gets audio/video content from one or more of audio/video content providers 111A-111C for display to each respective viewer (while three audio/video content providers are shown in this example, any desired number of such audio/video content providers may be provided). In one example, each of player components 105A-105C may communicate with each of audio/video content providers 111A-111C via the Internet. In one specific example, the content may comprise video (e.g., one or more live video feeds, one or more recorded video feeds), one or more still images (e.g., jpg, png) and/or audio (e.g., one or more live audio feeds, one or more recorded video feeds, an MP3 stream).

In another example, one or more of studios 101A-101C may provide its own content (e.g., live audio/video) to one or more of player components 105A-105C through channel server 103 (e.g., in a similar manner to conventional Internet television without using control messages to direct the player component to get that specific content from a content provider).

In another example, one or more studios and/or one or more player components may comprise software running as a desktop application (e.g., which communicates with the channel server(s) and/or the content provider server(s) over the Internet).

In another example, various embodiments of the present invention may operate in essentially real-time. In one specific example, the studios may control directly and at any moment in time what each client application (each player component) displays. The producer of a channel may, for example, change the text of the ticker, which will in turn send a control message to the channel server, which will propagate it to all client applications (all player components).

In another embodiment of the present invention a system for distributing audio/video convent via a network is provided, comprising: a client software application, wherein the client software application runs on a client device (see, e.g., player components 105A-105C of FIG. 1); and a messaging software application, wherein the messaging software application runs on a messaging server (see, e.g., channel server 103 of FIG. 1); wherein the client device and the messaging server are operatively connected together via the network such that the client software application receives at least one message from the messaging software application; wherein the at least one message causes the client software application to access at least: i) a first audio/video data element and ii) a second audio/video data element; and wherein the at least one message causes the client software application to composite together at least: i) the first audio/video data element and ii) the second audio/video data element and to render at least the composited first and second audio/video data elements at the client device.

In one example, the client device may comprise a client computer.

In another example, the network may comprise the Internet.

In another example, the client software application may access the first and second audio/video data elements via the network.

In another example, the client software application may access the first and second audio/video data elements from a content server (see, e.g., audio/video content providers 111A-111C of FIG. 1).

In another example, the client software application may access the first audio/video data element from a first content server, the client software application may access the second audio/video data element from a second content server, and the first content server may be distinct from the second content server.

In another example, the client software application may access at least one of the first and second audio/video data elements by opening a data stream.

In another example, the client software application may access at least one of the first and second audio/video data elements by downloading.

In another example, a studio software application may be provided, wherein the studio software application may run on a studio computer (see, e.g., studios 101A-101C of FIG. 1).

In another example, the studio computer and the messaging server may be operatively connected together via the network such that the messaging software application receives at least one message from the studio software application.

In another example, the at least one message received by the client software application from the messaging software application may be based at least in part upon the at least one message received by the messaging, software application from the studio software application.

In another example, the messaging, compositing and/or rendering may be carried out in essentially real-time.

In another embodiment of the present invention a system for distributing audio/video convent via a network is provided, comprising: a plurality of client software applications, wherein each of the plurality of client software applications runs on a respective one of a plurality of client devices (see, e.g., player components 105A-105C of FIG. 1); and at least one messaging software application, wherein the messaging software application runs on a messaging server (see, e.g., channel server 103 of FIG. 1); wherein each of the plurality of client devices is operatively connected with the messaging server via the network such that each of the plurality of client software applications receives at least one message from the messaging software application; wherein at least one of the messages cause each of the plurality of client software applications to access at least: i) a first audio/video data element and ii) a second audio/video data element; and wherein at least one of the messages cause each of the plurality of client software applications to composite together at least: i) the first audio/video data element and ii) the second audio/video data element and to render at least the composited first and second audio/video data elements at each respective one of the plurality of client devices.

In one example, at least one message received by at least one of the plurality of client software applications may be distinct from at least one message received by at least another of the plurality of client software applications.

In another example, at least one message received by each of the plurality of client software applications may synchronize each of the plurality of client software applications such as to render the composited first and second audio/video data elements in essentially the same state at essentially the same time.

In another example, a plurality of studio software applications may be provided, wherein each of the plurality of studio software applications may run on a respective one of a plurality of studio computers (see, e.g., studios 101A-101C of FIG. 1).

In another example, each of the plurality of studio computers may be operatively connected with the messaging server via the network such that the messaging software application receives at least one message from each of the plurality of studio software applications.

In another example, at least one message received by each of the plurality of client software applications from the messaging software application may be based at least in part upon at least one message received by the messaging software application from at least one of the plurality of studio software applications.

In another example, a plurality of messaging software applications may be provided, wherein each of the plurality of messaging software application may run on a respective one of a plurality of messaging servers, wherein each of the plurality of client devices may be operatively connected with at least one of the plurality of messaging servers via the network such that each of the plurality of client software applications receives at least one message from at least one of the plurality of messaging software applications, and wherein each of the plurality of studio computers may be operatively connected with at least one of the plurality of messaging servers via the network such that at least one of the plurality of messaging software applications receives at least one message from at least one of the studio software applications.

In another embodiment of the present invention a method for distributing audio/video convent via a network is provided, comprising: sending to a client software application at least one message, wherein the client software application runs on a client device (see, e.g., player components 105A-105C of FIG. 1). wherein the at least one message causes the client software application to access at least: i) a first audio/video data element and ii) a second audio/video data element, and wherein the at least one message causes the client software application to composite together at least: i) the first audio/video data element and ii) the second audio/video data element and to render at least the composited first and second audio/video data elements at the client device; and receiving from the client software application at least one message, wherein the at least one message received from the client software application indicates at least one of: (a) a degree of access by the client software application to at least the first audio/video data element and to the second audio/video data element; (b) a degree of completion of the compositing together at least the first audio/video data element and the second audio/video data element; and (c) a degree of completion of rendering at least the composited first and second audio/video data elements.

In another example, the at least one message may be received at a studio software application from the client software application, and the studio software application may run on a studio computer (see, e.g., studios 101A-101C of FIG. 1).

In another example, at least one message may be received at the studio software application from the client software application via the network.

In another example, the at least one message may be received at the studio software application from the client software application directly.

In another example, the at least one message may be received at the studio software application from the client software application by passing through at least one intermediary server.

In another example, the steps may be carried out in the order recited.

Figure 2:
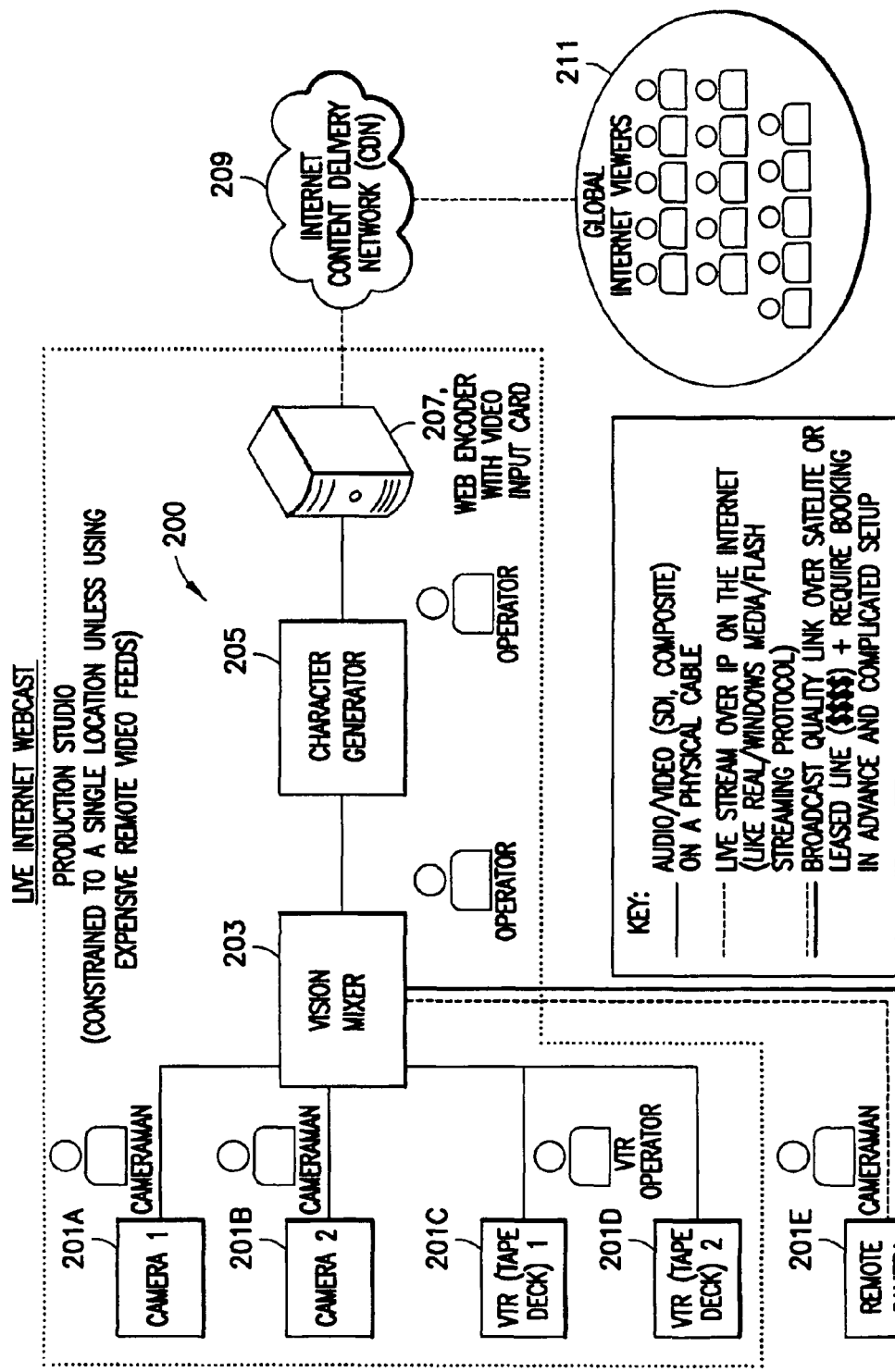
FIG. 2 shows a system architecture according to a conventional live Internet webcast.

Referring now to FIG. 2, a system architecture according to a conventional live Internet webcast is shown. As seen in this Fig., production studio 200 is utilized to mix audio/video signals from sources 201A-202D at mixer 203. The output of mixer 203 is feed to character generator 205. The output of character generator 205 is feed to web encoder 207. The output of web encoder 207 is feed to content delivery network 209 (which may include load balancing) and then on to viewers 211. Thus, the content is simply assembled at the source and streamed out.

Figure 3:
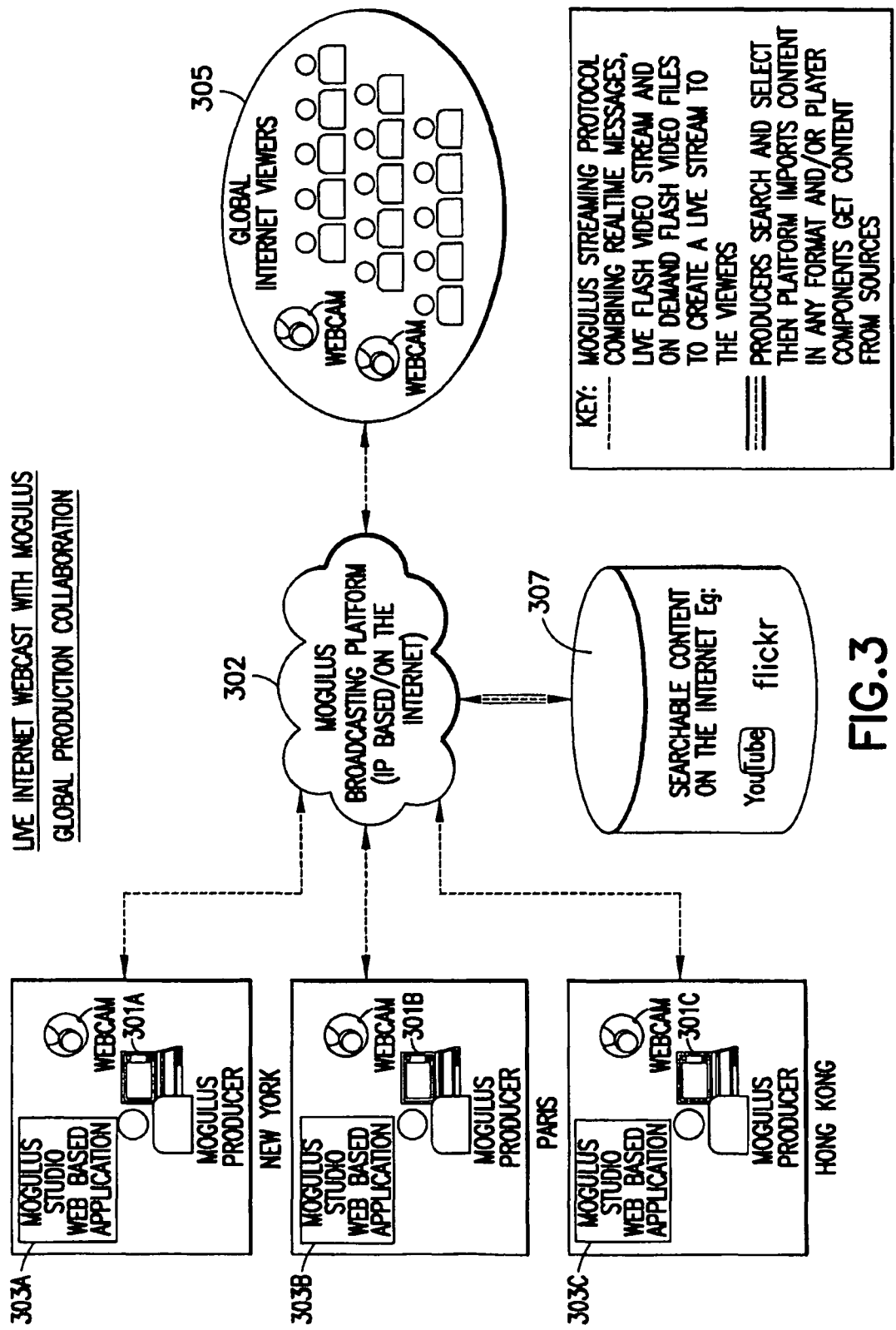
FIG. 3 shows a system architecture according to another embodiment of the present invention.

In contrast to FIG. 2, FIG. 3 shows a system architecture according to an embodiment of the present invention in which each of remote producers 301A-301C utilizes associated studio 303A-303C to communicate via the Internet with broadcasting platform 302 in order to control what each of viewers 305 sees on an associated player component. Each of the player components may receive control messages from broadcasting platform 302, each of the player components may retrieve content from content sources 307 (e.g., as directed by the control messages), each of the player components may receive content from one or more of studios 303A-303C (e.g., via broadcasting platform 302) and/or each of the player components may receive content from broadcasting platform 302. Of note, broadcasting platform 302 is operatively connected to the Internet to communicate with the studios, the player components and/or the content sources. Similarly, each of the player components (which are not separately shown in the Fig.) is operatively connected to the Internet to communicate with broadcasting platform 302 and content sources 307.

Figure 4A:
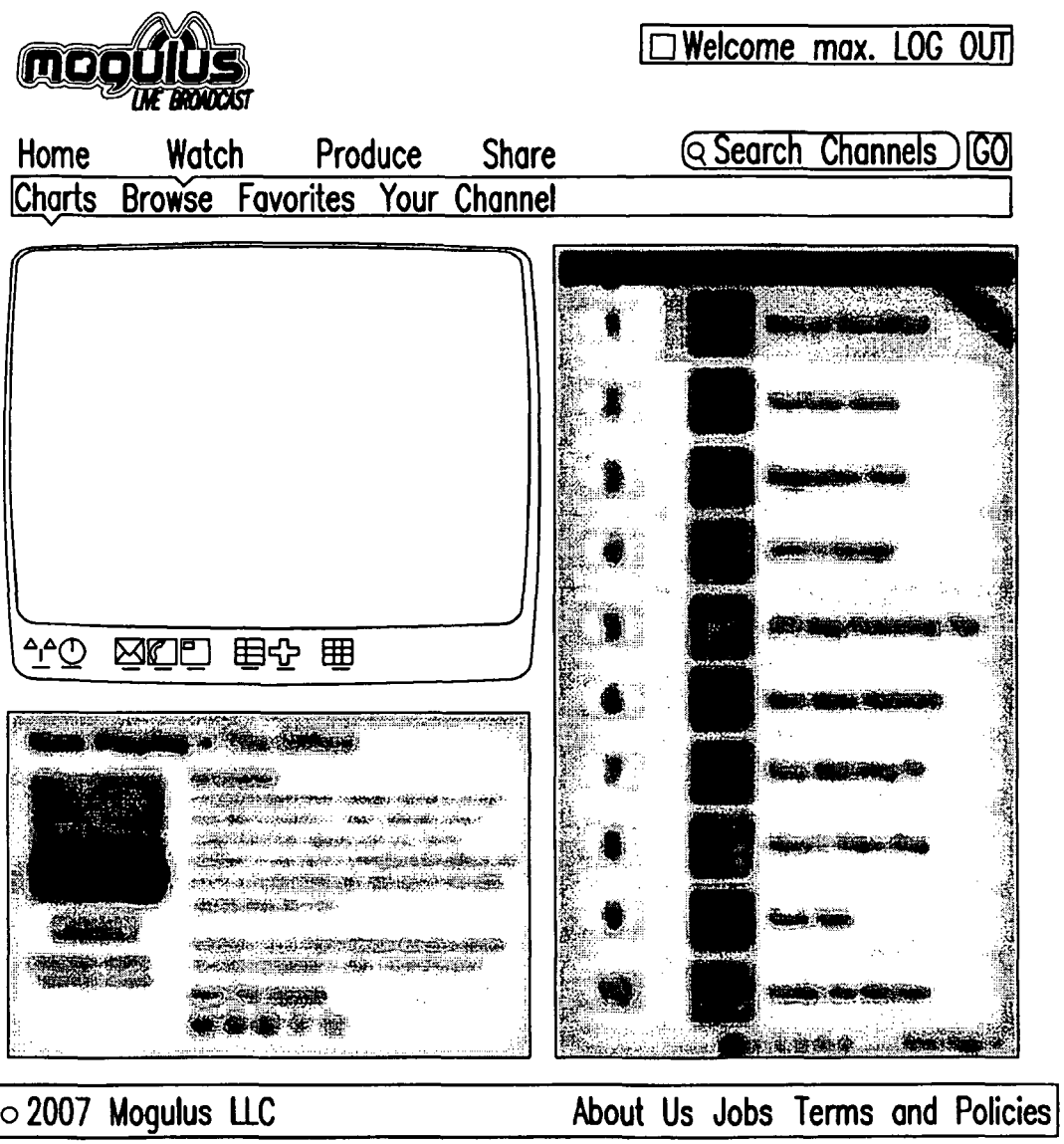
FIGS. 4A-4F show web browser screenshots according to other embodiments of the present invention.

Referring now to FIG. 4A, a web browser screenshot of a player component according to an embodiment of the present invention is shown. The player component may include one or more of the following:

- Mail—send a message to one or more channel producers
- Call—call one or more channel producers live with the viewer's webcam (a channel producer may put the calling viewers "on the air" live)
- Chat—chat among viewers and producers
- Guide—browse other channels available to the player component
- Full screen Referring now to FIGS. 4B-4F, web browser screenshots of a studio according to an embodiment of the present invention is shown.

With regard to these FIGS. 413-4F, it is noted that use of the studio may, in one example, proceed as follows:

- A producer logs onto a website with a channel name, a username and a password and clicks "Create New Channel"
- The producer then selects "Configure The Channel" (see FIG. 4B), which may be a one-time process
- The producer then selects "Get Content" (see FIG. 4C), which may comprise searching the Internet for images/audio/video from within the studio
- The producer then selects "Create A Storyboard" (see FIG. 4D), which may comprise dragging the search results from the "Get Content" step into a storyboard within the studio
- The producer then selects "Broadcast Live" (see FIGS. 4E and 4F), which may comprise using a live mixer or turning on an "auto-pilot"

Figure 4B:
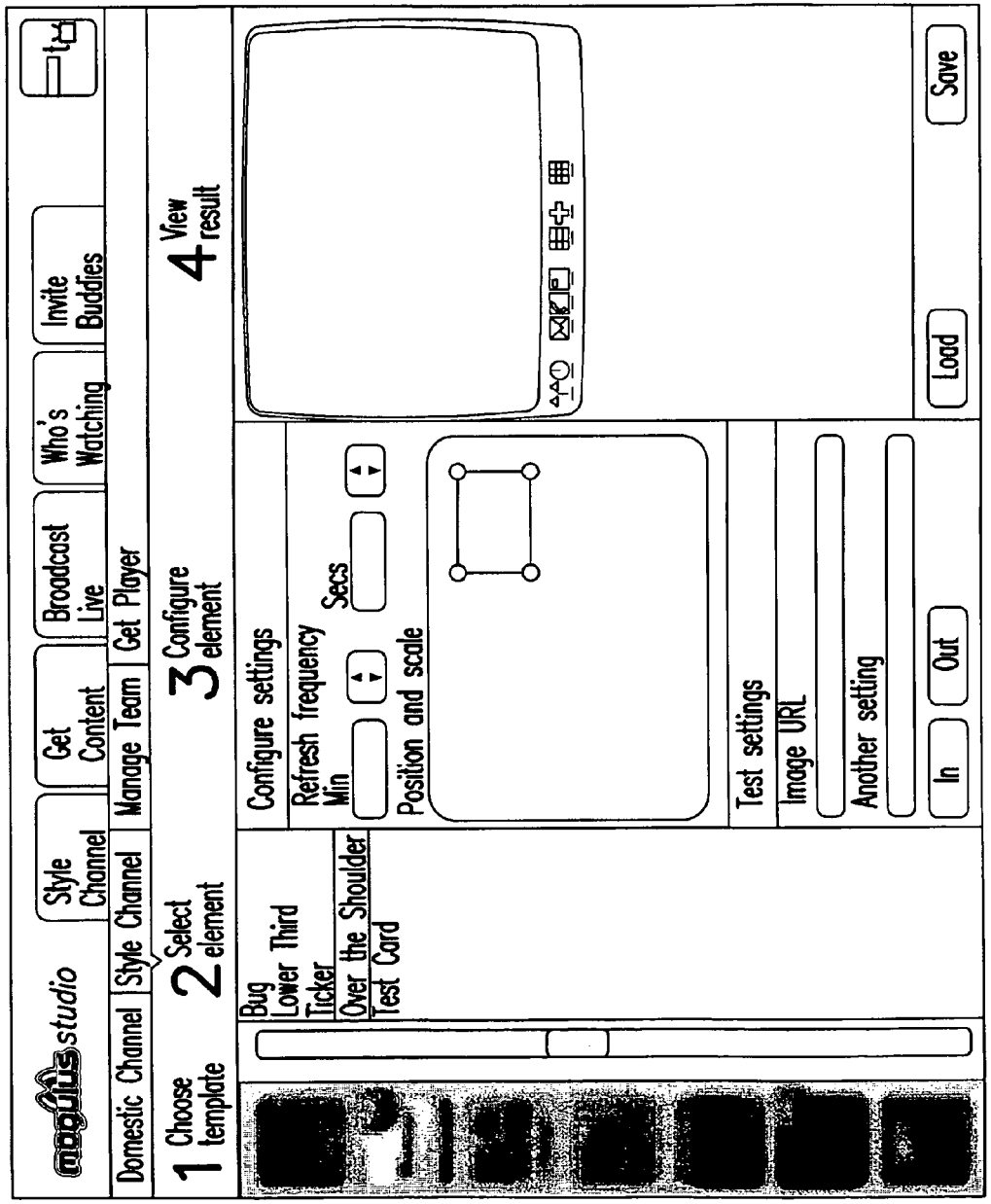

More particularly, with regard to "Configure The Channel", FIG. 4B shows a screenshot of how the producer of a newly created channel can pick a broadcast graphics template and customize and preview (not shown) the graphics. Such graphics may include (but not be limited to): Bug; Lower Third; Ticker; Over The Shoulder; Test Card. This configuration of a channel may, in one example, be a one-time process (similar to the way that some blog publishing software may let you choose and configure templates to establish an identity when you first launch your blog).

Figure 4C:
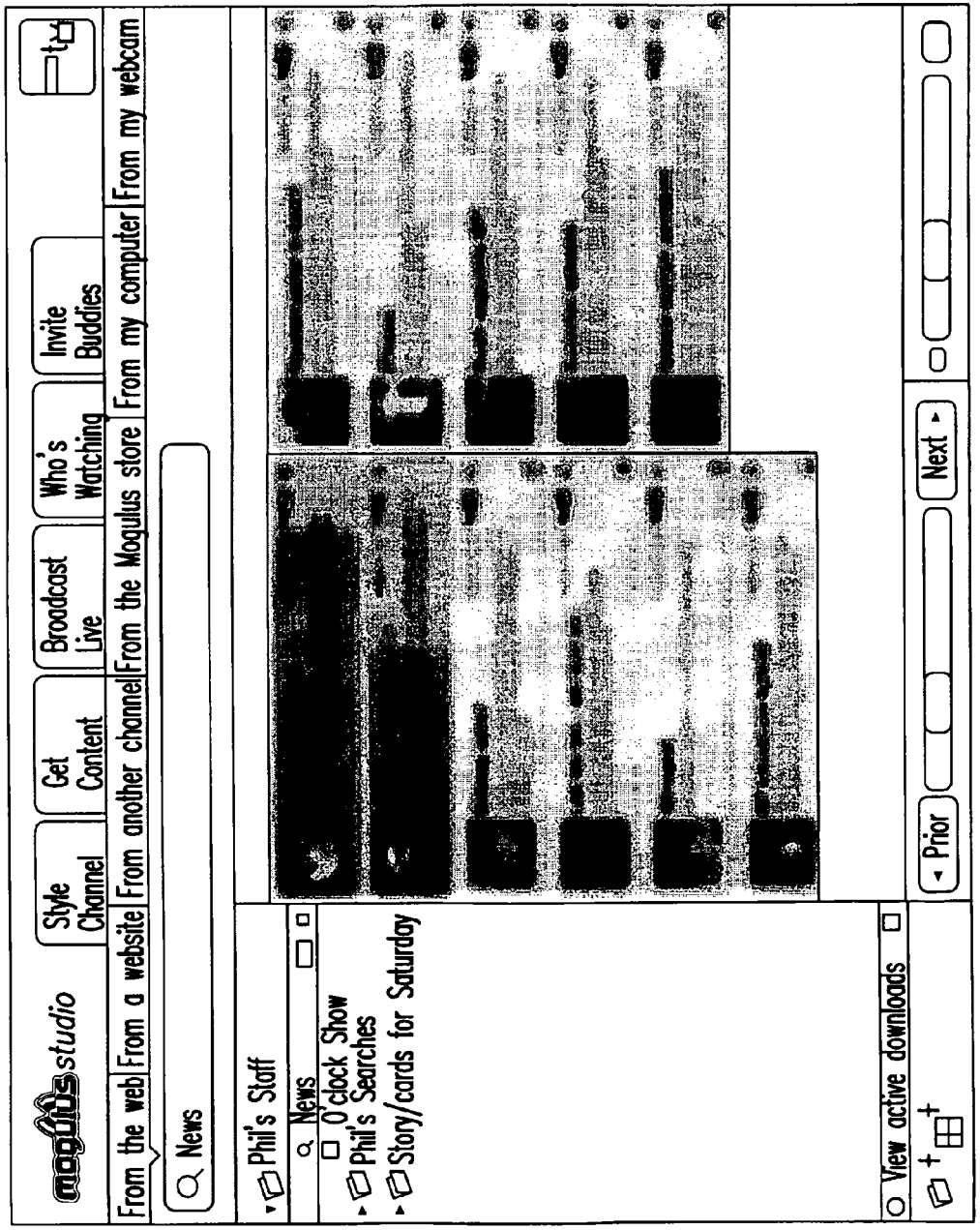

Further, with regard to "Get Content", FIG. 4C shows a screenshot of how the producer of a newly created channel can search the Internet for images/audio/video from within the studio. The "Get Content" tab may allow users to easily type keywords and search integrated sources (e.g., AOL Video, Youtube, Google, etc.). The Search results may be streamed in. The user may preview any clip. The user may drag the clips into the user's storyboard in preparation for a live broadcast and/or play list loop. When the user drags the search results into a storyboard, the system of this embodiment may automatically download the files, transcode the files and post the files to the servers of the system (the user may see a progress bar). This FIG. 4C also shows some other example sources of audio/video content including (but not limited to): from the web; from a website; from another channel; from an online store; from the user's computer; from the user's webcam.

Figure 4D:
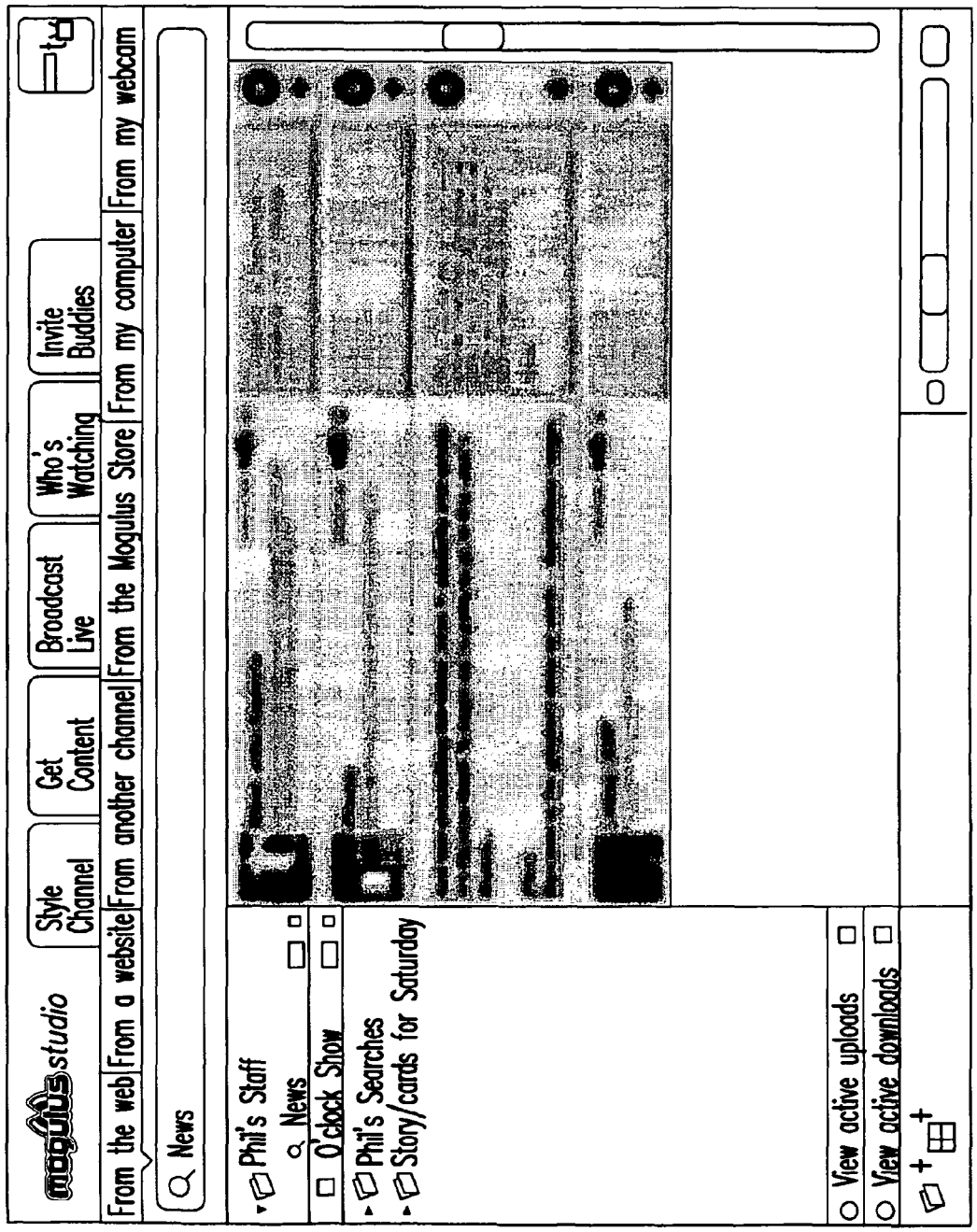

Further, with regard to "Create A Storyboard", FIG. 4D shows a screenshot of how a storyboard may be used as a playlist for the auto-pilot and/or a guide to produce a live broadcast (similar to a script). In one example, the producer can go into the storyboard and: re-order clips; add notes useful to him and his fellow producers; and/or add text for the presenter to say while on camera (similar to a broadcast teleprompter). In addition, collaboration may be provided such that searches and/or storyboards are available in realtime to any producer logged into a given channel (e.g., if one producer adds text or re-orders a storyboard, all the other producers of that channel can seen the changes in realtime).

Figure 4E:
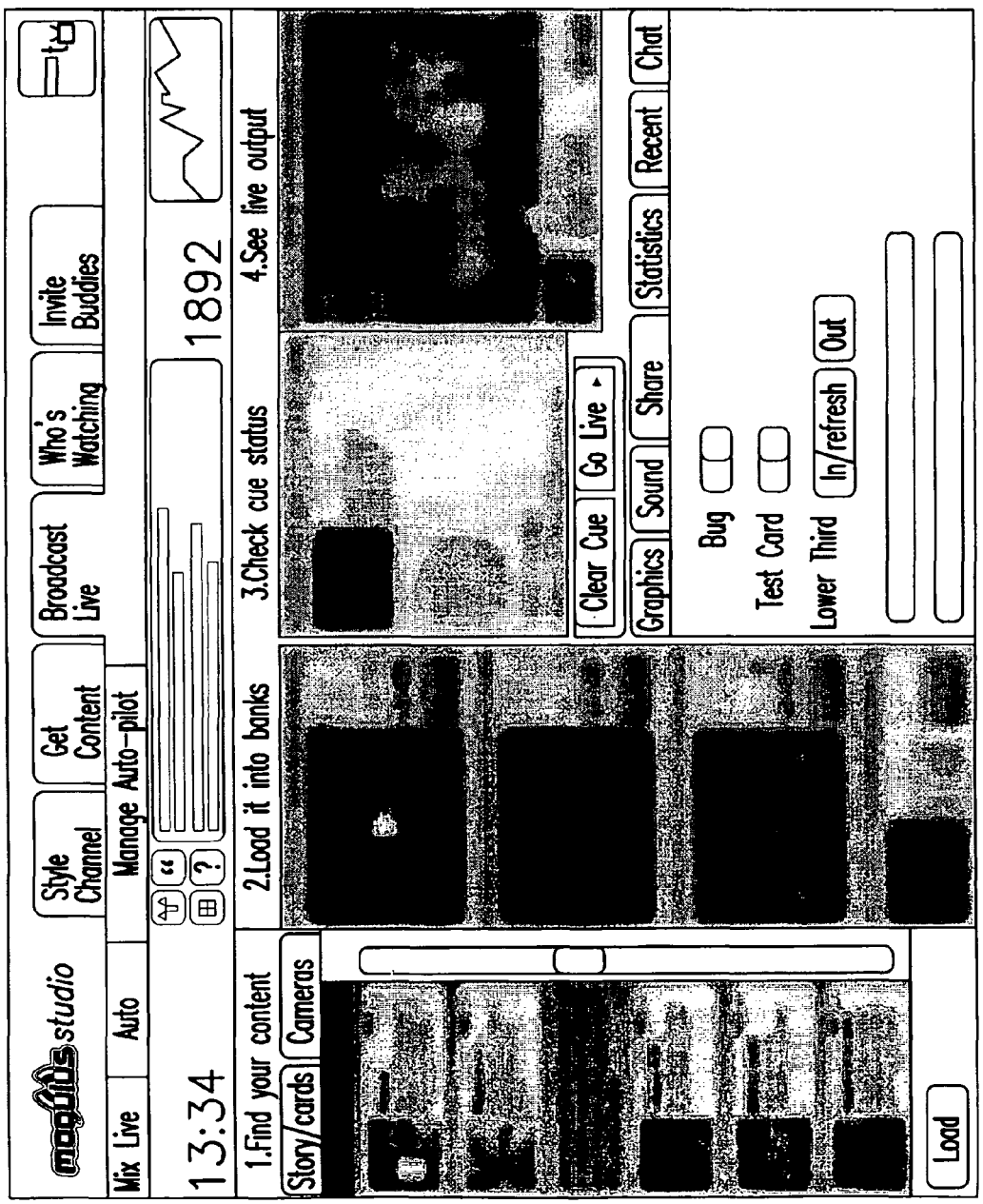

Further, with regard to "Broadcast Live", FIG. 4E shows a screenshot of "Live Studio", where producers mix live (when the channel is in "auto-pilot" mode a playlist may be automatically followed (in one example, the auto-pilot can be seen pressing the various buttons on the studio screen)). Of course, when auto-pilot is not turned on, the producer may mix in realtime.

In any case, in one example the basic process may be as follows:

- The producer loads a storyboard on the left
- The producer drags the clips into the bank for preview
- The producer presses CUE
- When the system is ready and the producer is ready the producer presses "Go Live"
- The audio/video will then mix (cross fade) with the current output
- The producer may then repeat as needed or turn on the auto-pilot as desired Of note, the bottom-right of this FIG. 4E shows the following tabs:

- Graphics—type in information (e.g., names and titles) and control how graphics transition on and off the screen
- Sound—sound effects
- Transitions—wipes and effects
- Statistics—details about who is watching
- Record—record your live show for re-broadcast
- Chat—chat between logged-in producers (output shown at the middle top section)

Figure 4F:
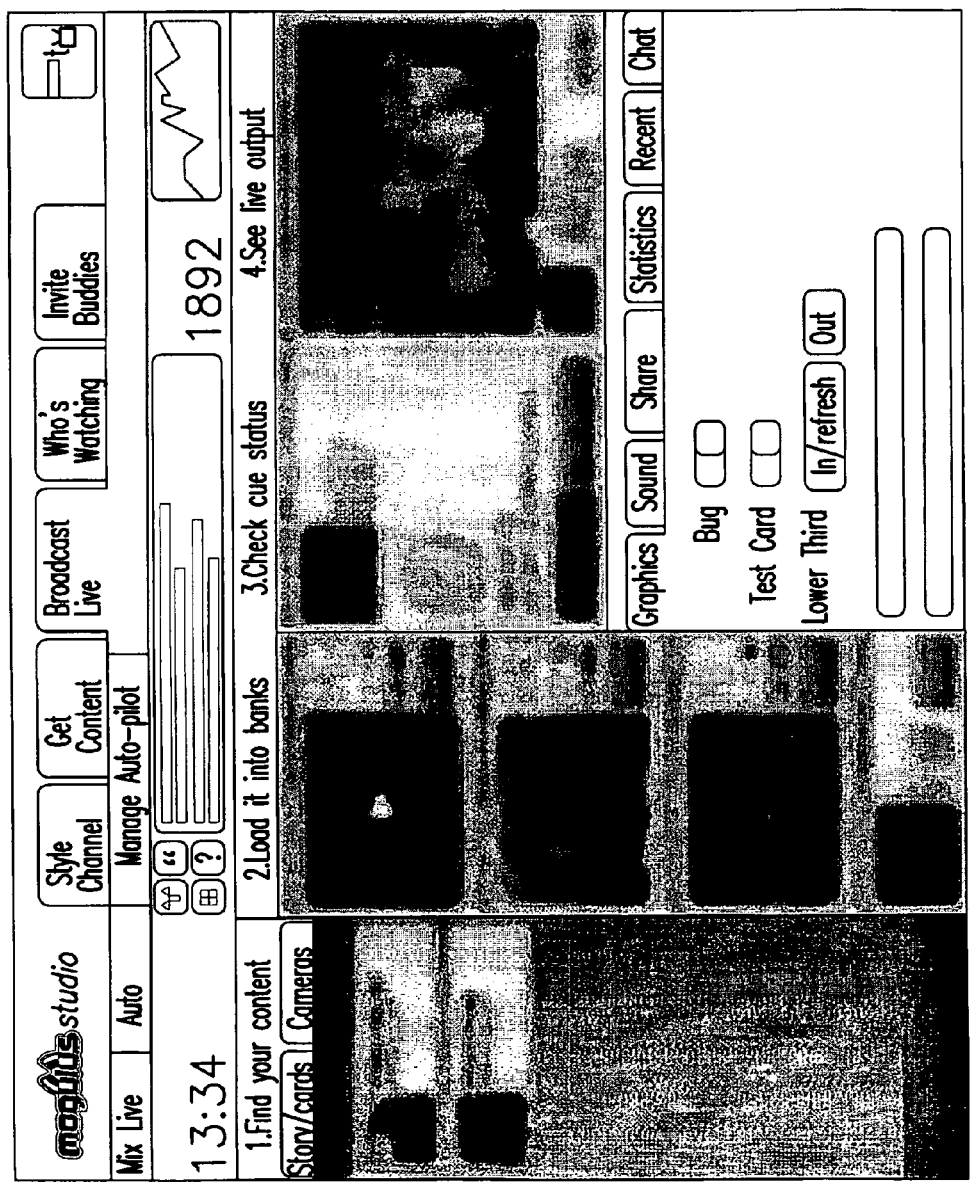

Still referring to "Broadcast Live", FIG. 4F shows another screenshot of "Live Studio". As seen in this Fig., the producer has now selected the cameras tab on the left. Here the producer can see the cameras of all of the other producers logged-in for this channel. In one example, a producer can simply drag any webcam on the bank and make it live. In another example, viewers can call the channel. A switchboard tab may allow someone from the production team to select one or more viewers and put the selected viewer(s) in the camera list for live broadcast. A video mail functionality may be provided if a producer does not reply on-time to one or more calls (the viewer may be able to leave a message for future broadcast).

In another example, the architecture may be platform agnostic.

In another example, the architecture may work for cable operators, mobile operators, etc.

In another embodiment the present invention relates to a realtime shared production tool. In this regard, such a realtime shared production tool may comprise capabilities to have producers around the world controlling (e.g., mixing, etc.) together a single video channel in realtime. This may comprise a "virtual, global TV studio".

In another embodiment the present invention relates to interactivity with viewers. In this regard, viewers may call the channel (e.g., in realtime) using audio/video (e.g., using the viewer's webcam and/or microphone), be selected by a switchboard and then be put through live on the channel (if the producers so decide).

In another example, the present invention may provide a single studio for each channel.

In another example, the present invention may provide a plurality of studios for each channel (in one specific example, there may be a "master" studio that takes precedence over the other studios associated with a given channel; in another specific example, there may be no "master" studio, such that none of the plurality of studios associated with a given channel takes precedence over the other).

Of note, regarding the case of a plurality of studios for each channel, as new studios become associated with a given channel, the new studio(s) may be synchronized with the existing studio(s).

In another example, a player component may comprise software (e.g., which may be run in a web browser) and the player component/browser may run on a desktop computer, a laptop computer, a PDA, a mobile phone, etc.

In another example, a player component may provide to the viewer no facility for a fast forward operation, a rewind operation or the like (similar to a conventional television).

In another example, each channel may be public or private (e.g., accessible only via invitation and/or through the use of a username/password).

In another example, advertisements may be inserted into one or more channels. In one specific example the advertisements may be inserted on a set schedule (e.g., periodically, every 10 minutes). In another specific example, the advertisements may be targeted based upon channel content (e.g., a channel carrying sports content gets sports-related advertising; a channel carrying fashion content gets fashion-related advertising).

In another example, each of the studios and/or the player components may be an online Rich Internet Application built using ADOBE Flash/Flex/ActionScript 3 and no downloads may be required; further, each of the studios and/or the player components may be MAC/PC/LINUX compatible.

In another example, a .swf (a file created with ADOBE Flash/Flex/ActionScript 3 software) may be utilized to allow producers to put broadcast graphics on one or more desired channels.

As described above, one example of the present invention may provide a live streaming protocol (including control messages) for controlling one or more player components from one or more servers (wherein at least some of the content played by the player components(s) comes from source(s) different than the server(s) providing the control messages).

Further, as described above, another example of the present invention may provide for global distributed production/mixing (e.g., multiple studios at distinct remote locations providing control messages for a given channel to control one or more player components).

Further still, as described above, another example of the present invention may provide for quality of service (QoS) measurement and/or control. In one specific example, a channel server may receive feedback from one or more player components regarding when the player component(s) are ready to play content. In another example, a QoS engine may be integrated to ensure that all the player components remain in synchronization (e.g., late-arriving player components are synchronized with player components that are already being used at the time the late-arriving player components start). In another example, the synchronization may utilize state information. In another example, the synchronization may comprise predictive synchronization.

Further still, as described above, another example of the present invention may provide for interactive communication among the studio(s) and the player component(s).

Further still, as described above, another example of the present invention may provide users (e.g., producers) the ability to record instructions for broadcasting (see the "autopilot" discussed above) as one or more text files containing the necessary instructions.

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic, AJAX, Javascript, ADOBE Flash/Flex/ActionScript 3). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, any desired number of studio(s), player component(s), channel server(s) and/or content provider server(s) may be associated with a given channel. Further still, any desired number of channels (and any desired number of associated producer(s) and/or associated viewer(s)) may be provided. Further still, the various steps may be carried out in any desired order (and any desired steps may be added and/or any desired steps may be eliminated).

What is claimed is:

1. A system, comprising:
    a) a non-transient memory having at least one region for storing computer executable program code; and
    b) at least one processor for executing the program code stored in the non-transient memory, wherein the program code comprising:
        code to cause to display to each producer of a plurality of producers, over a first computer network, from at least one remote channel control programmed engine, an instance of a client studio software application;
        code to control, through each instance of the client studio software application and the at least one remote channel control programmed engine, by each producer of the plurality of producers, in real-time, at least one live audio/video content produced by the plurality of producers based, at least in part, on the following activities performed by the plurality of producers at essentially the same time:
            i) remotely and synchronously contributing, in real-time, audio/video content to the at least one live audio/video content that is being produced by the plurality of producers and is broadcasted to a plurality of viewers wherein the viewers are distinct from the producers and wherein the viewers are remotely located from the producers, and
            ii) remotely sending a plurality of control messages, wherein the control messages control at least the following:
                1) at least one remote live camera that records the at least one live audio/video content, and
                2) how the at least one live audio/video content is being presented to the plurality of viewers; and
        code to incorporate, in real-time, the at least one live audio/video content produced by the plurality of producers into at least one live audio/video data stream transmitted, over a second computer network, to a viewing device of each viewer from the plurality of viewers.

2. The system of claim 1, wherein the program code further comprises:
    code to access a first audio/video data element for the at least one live audio/video content from a first content server, and
    code to access a second audio/video data element for the at least one live audio/video content from a second content server, wherein the first content server is distinct from the second content server.

3. The system of claim 1, wherein the first computer network and the second computer network are the same.

4. The system of claim 1, wherein the first computer network and the second computer network are different.

5. A method, comprising:

specifically programming at least one remote channel control programmed engine to perform at least the following:

causing to display, by at least one remote channel control programmed engine operating on at least one computer machine, over a first computer network, an instance of a client studio software application to each producer of a plurality of producers;

allowing, by the at least one remote channel control programmed engine, through each instance of the client studio software application, each producer of the plurality of producers, in real-time, to control at least one live audio/video content produced by the plurality of producers based, at least in part, on the following activities performed by the plurality of producers at essentially the same time:

i) remotely and synchronously contributing, in real-time, audio/video content to the at least one live audio/video content that is being produced by the plurality of producers and is broadcasted to a plurality of viewers wherein the viewers are distinct from the producers and wherein the viewers are remotely located from the producers, and ii) remotely sending a plurality of control messages, wherein the control messages control at least the following:

1) at least one remote live camera that records the at least one live audio/video content, and 2) how the at least one live audio/video content is being presented to the plurality of viewers; and incorporating, by the at least one remote channel control programmed engine, in real-time, the at least one live audio/video content produced by the plurality of producers into at least one live audio/video data stream transmitted, over a second computer network, to a viewing device of each viewer from the plurality of viewers.

6. The method of claim 5, wherein the first computer network and the second computer network are the same.

7. The method of claim 5, wherein the first computer network and the second computer network are different.

8. The method of claim 5, wherein the at least one remote channel control programmed engine is further program to perform at least the following:

accessing a first audio/video data element for the at least one live audio/video content from a first content server; and accessing a second audio/video data element for the at least one live audio/video content from a second content server, wherein the first content server is distinct from the second content server.

* * * * *